United States Patent Office 3,644,552
Patented Feb. 22, 1972

3,644,552
PROCESS FOR SEPARATING META XYLENE
FROM PARA XYLENE
Vincent A. Notaro, Monroeville, Charles M. Selwitz, Pitcairn, and William L. Walsh, Glenshaw, Pa., assignors to Gulf Research & Development Company, Pittsburgh, Pa.
No Drawing. Filed Apr. 21, 1969, Ser. No. 818,066
Int. Cl. C07c 7/02, 25/02
U.S. Cl. 260—674 A         15 Claims

ABSTRACT OF THE DISCLOSURE

A process for separating para xylene from a mixture containing para xylene and meta xylene by selectively halogenating the meta xylene which involves heating the mixture in the presence of copper, manganese, cerium, cobalt, vanadium, chromium, iron, nickel, cadmium, tin, antimony, mercury, bismuth, a noble metal or compounds of these metals; nitrate ions, NO, $NO_2$ or $NO_2Cl$; a chloride ion or a bromide ion; oxygen; and an inert organic solvent containing less than about 28 percent by weight of water.

---

This invention relates to a process for recovering substantially pure para xylene from a mixture predominating in para xylene and meta xylene.

Para xylene can be obtained, for example, from a typical $C_8$ aromatic cut from a petroleum stream, which can contain about 20 percent by weight of ortho xylene, 20 percent by weight of para xylene, 20 percent by weight of ethyl benzene, and 40 percent by weight of meta xylene. Since the boiling points of these compounds at atmospheric pressure are, respectively, 144.4° C., 138.4° C., 136.2° C. and 139.1° C., ortho xylene and ethyl benzene can be separated from the defined mixture relatively easily by conventional distillation procedures, leaving behind para xylene and meta xylene. Since the boiling points of the latter compounds are so close to each other it is exceedingly difficult, and in most cases almost impossible to recover a substantially pure para xylene not contaminated with meta xylene by simple distillation procedures. By "substantially pure" we mean a para xylene wherein the same is present in an amount of at least about 99 percent by weight. Substantially pure para xylene is required, for example, as charge in processes for converting the same to terephthalic acid for preparation of polyester resins.

A procedure commonly employed for separating para xylene from meta xylene is the low temperature crystallization process wherein the mixture is cooled to a temperature, for example, about −50° C., at which a substantial amount of para xylene crystallizes out of solution and is recovered therefrom by filtration. Low temperature operations, however, are expensive. Moreover, the filtrate still contains an appreciable amount of dissolved para xylene, for example, as much as 30 percent by weight of the original, and recovery therefrom by low temperature recrystallization requires still lower temperatures than used in the first stage. In fact, substantially complete recovery of substantially pure para xylene is not feasible.

We have found that substantially pure para xylene can be recovered from the mixture of meta xylene and para xylene defined above, or, in fact, from any mixture containing predominant amounts of the same, by treating such mixture substantially in accordance with the procedure defined and claimed in application Ser. No. 730,589, filed May 20, 1968, and assigned to the same assignee as this invention, provided the amount of water in the solvent, defined hereinbelow, in the mixture to be treated is below about 28 percent by weight. By "percent by weight of water" we mean the weight of water over the weight of water plus the weight of solvent times one hundred.

Briefly, in accordance with the procedure defined in said application and which is to be used herein, the mixture of meta xylene and para xylene is heated in the presence of a compound selected from the group consisting of copper, manganese, cerium, cobalt, vanadium, chromium, iron, nickel, cadmium, tin, antimony, mercury, bismuth, the noble metals (platinum, palladium, iridium, rhodium, osmium and ruthenium) and compounds of these metals, a substance selected from the group consisting of nitrate ions, nitrite ions, NO, $NO_2$ and $NO_2Cl$, a chloride or bromide ion, oxygen and an inert organic solvent.

Thus, the reaction system will include meta xylene and para xylene. Also present in the reaction is a metal selected from the group consisting of copper, manganese, cerium, cobalt, vanadium, chromium, iron, nickel, cadmium, tin, antimony, mercury, bismuth, the noble metals and compounds of these metals. Examples of compounds that can be employed include metallic iron, ferric acetate, ferric propionate, ferric hydroxy acetate, ferric chloride, ferric hydroxide, ferric nitrate, ferric phosphate, ferric sulfate, ferrous acetate, ferrous nitrate, ferrous lactate, ferrous bromide, palladium, rhodium, iridium, osmium, ruthenium, platinum, rhodium formate, palladium acetate, palladium propionate, iridium butyrate, palladium pivalate, palladium octanoate, osmium isooctanoate, palladium benzoate, palladium laurate, ruthenium stearate, palladium isobutyrate, palladium paratoluate, platinum gamma-chlorobutyrate, ruthenium tetracontanoate, osmium phenylacetate, irridium cyclohexane carboxylate, rhodium crotonate, palladium furoate, palladium heptanoate, palladium eicosanoate, palladium chloride, palladium nitrate, palladium oxide, rhodium bromide, iridium sulfate, osmium cyanide, ruthenium perchlorate, rhodium iodide, platinum fluoride, platinum phosphate, platinum pyrophosphate, ruthenium oxide, platinic bromide, platinous bromide, platinum oxide, platinous cyanide, platinum hydroxide, rhodium sulfate, rhodium oxide, osmium tetroxide, ruthenium trichloride, iridium oxide, metallic copper, cupric nitrate, cuprous chloride, cupric acetate, manganese, manganic oxide, manganese acetate, cerium, cerous nitrate, ceric ammonium sulfate, cobalt, cobaltous bromide, cobaltous fluoride, cobaltous perchlorate, cobaltic chloride, vanadium, vanadium pentoxide, vanadium dichloride, vanadium pentafluoride, vanadyl bromide, chromium, chromium trioxide, chromic acetate, nickel, nickel acetate, nickel nitrate, cadmium, cadmium perchlorate, cadmium manganate, tin, tin tetrachloride, tin trifluoride, tin sulfate, antimony, antimony chloride, antimony butyrate, mercury, mercuric acetate, mercuric nitrate, bismuth, bismuth phosphate, bismuth arsenate, bismuth oxychloride, etc. Of the noble metal compounds that can be employed herein, a carboxylic acid salt of a noble metal is desirable. Thus, the cationic portion of the salt can be one of the defined noble metals, palladium, while the anionic portion thereof can be derived from the group of carboxylic acids, straight and branched chain, having from one to forty carbon atoms, preferably from two to six carbon atoms, such as formic, acetic, propionic, butyric, pivalic, octanoic, isooctanoic, benzoic, lauric, stearic, isobutyric, para-toluic, gamma-chlorobutyric, tetracontanoic, phenylacetic, cyclohexane carboxylic, crotonic, furoic, heptanoic, eicosanoic, etc. Pallaium acetate, for example, is highly desirable. In the system, however, such palladium salts will be converted to the corresponding palladium chloride or palladium bromide, and, to a certain extent, to palladium nitrate. Accordingly, in many cases it may be desirable to add the noble metal compound to the reaction mixture in the latter forms.

It is imperative that the above materials be brought into contact with each other in the presence of a substance selected from the group consisting of nitrate ions, nitrite ions, NO, $NO_2$ and $NO_2Cl$. Thus, any compound falling within the above definition or which, for example, by ionization, oxidation or disproportionation, under the reaction conditions defined herein will result in the same can be employed. By "nitrate ions" we mean to include $NO_3^-$, a singly charged anion conaining one nitrogen atom and three oxygen atoms. By "nitrite ions" we mean to include $NO_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, nitryl chloride, etc.

Additionally there must be present in the reaction system chloride ions or bromide ions in sufficient quantities to halogenate substantially solely meta xylene. By "chloride ions or bromide ions" we mean a singly negatively charged chlorine or bromine atom. Although the chloride ion or bromide ion can be obtained from one of the metal compounds defined hereinabove, such as ferric chloride or palladium chloride, this is not preferred. Desirably the chloride ion or bromide ion is obtained from any compound which is capable of dissociating in the reaction system to chloride or bromide ions, such as hydrogen chloride, hydrogen bromide, ammonium chloride, ammonium bromide, organic chlorides and bromides such as aniline hydrochloride, methyl amine hydrochloride, benzyl trimethyl ammonium bromide and metallic chlorides and bromides such as sodium chloride, potassium bromide, rubidium chloride, magnesium bromide, cupric chloride, barium chloride, calcium chloride, aluminum bromide, etc. The amount of chloride or bromide ion present in the system relative to the meta xylene on a molar basis can be from about 10:1 to about 1:1.05, preferably from about 2:1 to about 1:1.

The reaction defined herein is carried out in the presence of molecular oxygen. The amount of molecular oxygen that can be employed relative to the meta xylene, on a molar basis, can be from about 1000:1 to about 1:2, preferably from about 10:1 to about 1:1.

The mixture herein defined is heated together in an inert organic solvent which will not adversely affect the course of the reaction and will not react with the reactants and/or the products produced herein. Examples of such solvents are ethers, amides, sulfoxides, ketones, such as meta dioxane, dimethylacetamide, dimethylformamide, dimethylsulfoxide, acetone, etc. In a preferred embodiment however, the solvent is a liquid carboxylic acid, straight or branched chain, having preferably from one to ten carbon atoms, more preferably from two to six carbon atoms, specific examples of which have been set forth above.

The reaction defined herein is simply effected by bringing the materials together into contact with each other under specified conditions. The amount of metal, or compounds thereof, as metal, on a molar basis, employed can range from about 0.0001 percent to about five percent, preferably from about 0.01 percent to about one percent. The amount of nitrate ion, nitrite ion, NO, $NO_2$ or $NO_2Cl$ employed, on a molar basis, relative to the aromatic compound, can be from about 1:1 to about $1:10^6$, preferably from about 1:3 to about $1:10^6$. The amount of solvent employed can be from about 0.1 to about 1000 mols, preferably from about one to about fifty mols, per mol of aromatic compound. The temperature employed during the process can range from about 15° to about 200° C., preferably from about 60° to about 150° C., the pressure from about 0.1 to about 10,000 pounds per square inch gauge, preferably from about ten to about 1000 pounds per square inch gauge and the contact time from about 0.0001 to about 200, preferably from about one to about ten hours. It is understood that contact time is highly dependent upon the variables defined herein. The reaction can be terminated with good results by determining how much oxygen is required to halogenate all of the meta xylene and stopping the reaction when the oxygen absorption reaches such level, for we have found that all of the meta xylene will have reacted prior to any significant halogenation of the para xylene.

During the course of the reaction defined above halogenation of substantially all of the meta xylene occurs and, depending on the conditions employed, some halogenation of para xylene also occurs. The reaction also results in the production of some water, which can amount, for example, from about three to about 10 percent by weight of the original amount of acetic acid phase. At the end of the run there is present an upper organic phase, containing the two halogenated meta isomers, any halogenated para isomer that may have been formed and substantially all of the unreacted para xylene. The lower aqueous layer contains the solvent, for example, acetic acid, catalyst, water and unreacted halogen ions.

The two layers can be separated from each other in any convenient manner, for example, by decantation. Since the two, or three, when some para xylene is halogenated, halogenated isomers boil at a temperature of about 190° C. and para xylene boils at 138.4° C. at atmospheric pressure, simple distillation procedures will suffice to remove the halogenated compounds from the organic phase and obtain a para xylene having a purity in excess of about 99 percent by weight.

For purposes of economy the lower aqueous phase, after incorporation therein of additional catalytic components, as defined herein above, if required, and halogen ions is reused to treat additional meta- and para xylene mixtures and the procedure defined above is repeated. Of course, as this continues the amount of water in the aqueous phase increases. We have found that initially water has substantially no effect on the desired operation, but as the amount of water increases and amounts to about 25 percent by weight, and especially when the amount is about 28 percent by weight and above, product purity drops abruptly and a defined purified para xylene is not obtained. Accordingly, when this point is reached, or when any mixture of meta- and para xylene is to be treated in a solvent containing undesired amounts of water, the excess water is removed therefrom by any convenient means. For example, in the situation defined above, when the aqueous layer that is to be reused in the reaction system contains dissolved therein undesired amounts of water, the same is subjected to distillation conditions to remove water therefrom so that the total amount of water in the solvent is below about 28 percent and preferably is below about 25 percent by weight.

EXAMPLE I

A series of runs was made illustrating the advantage of operating in accordance with our process. Into a 200-milliliter glass bomb there was placed palladium acetate, hydrogen chloride, nitric acid, acetic acid, water, when present, para xylene and meta xylene. The reaction was pressured with oxygen to about 100 pounds per square inch gauge, heated to 60° C., and if the pressure at this point was not 150 pounds per square inch gauge, was pressured thereto with additional oxygen. The reaction was terminated when oxygen absorption ceased. The reactor was then cooled, depressured and the phases separated from each other by decantation. The organic phase was subjected to distillation to recover unreacted para xylene. The results obtained are set forth below in Table I.

TABLE I

| Run Number | 1 | 2 | 3 | 4 | 5 | 6 | 7 | 8 | 9 |
|---|---|---|---|---|---|---|---|---|---|
| Palladium acetate, millimols | 4 | 4 | 4 | 4 | 4 | 4 | 4 | 4 | 4 |
| Hydrogen chloride, millimols | 363 | 363 | 363 | 363 | 363 | 363 | 363 | 363 | 363 |
| Nitric acid, millimols | 11.1 | 11.1 | 11.1 | 11.1 | 11.1 | 11.1 | 11.1 | 11.1 | 11.1 |
| Acetic acid, millimols | 1,308 | 1,143 | 981 | 899 | 818 | 654 | 327 | 163.5 | 0 |
| Water, millimols | 0 | 545 | 1,090 | 1,365 | 1,635 | 2,180 | 3,270 | 3,820 | 4,360 |
| Para xylene, millimols | 135.2 | 135.2 | 135.2 | 135.2 | 135.2 | 135.2 | 135.2 | 135.2 | 135.2 |
| Meta xylene, millimols | 270.4 | 270.4 | 270.4 | 270.4 | 270.4 | 270.4 | 270.4 | 270.4 | 270.4 |
| Percent by weight of water in reaction mixture | 0 | 12.5 | 25 | 31.3 | 37.5 | 50 | 75 | 87.5 | 100 |
| Percent purity of recovered para xylene | 100 | 100 | 99.94 | 95.2 | 83.37 | 64.29 | 43.17 | 33.54 | 33.3 |
| Percent by weight of para xylene chlorinated | 17.59 | 17.65 | 30.5 | 14.98 | 9.56 | 5.42 | 2.22 | 0 | 0 |

The advantage of operating in accordance with the procedure defined and claimed herein is amply illustrated by the data in Table I. In Run No. 1 wherein no water was present in the reaction mixture initially the para xylene content of unreacted xylene was 100 percent. Of the 135.2 millimols of para xylene in the charge only 17.59 percent by weight thereof was chlorinated. Essentially similar results were obtained in Run No. 2 when only 12.5 percent by weight of water, was present. Even in Run No. 3 with 25 percent by weight of water present 99.94 percent by weight of the desired recovered product was para xylene. The remaining 0.06 percent was meta xylene. As the amount of water in the solvent was increased in the remaining runs the purity of the recovered para xylene was increasingly adversely affected.

EXAMPLE II

An additional run was made, in a manner similar to the above wherein there was employed 60 millimols of palladium acetate, 5843 millimols of hydrogen chloride, 327 millimols of nitric acid, 42,981 millimols of acetic acid, 25,068 millimols of water, 2,313 millimols of para xylene, and 4,381 millimols of meta xylene. The percent by weight of water in the acetic acid used was 14.9 percent. The temperature was 60° C., and the initial oxygen pressure 80 pounds per square inch gauge. The reaction was terminated at the end of 390 minutes. Only 5.2 grams of para xylene was chlorinated and the remainder had a purity of 99.8 percent.

Even though in our preferred embodiment a small amount of para xylene was halogenated, and therefore not recovered with the purified para xylene, the yield of purified para xylene is far greater than would have been obtained using ordinary distillation procedures or even the low-temperature crystallization procedure referred to hereinabove. Subjecting the halogenated mixture to hydrogenation, for example, to a temperature of about 200° to about 550° C. over palladium on alumina in the presence of hydrogen, will result in the production of meta- and para xylenes and hydrogen halide. The meta- and para xylene mixture thus obtained will be far richer in meta xylene than the original.

Obviously, many modifications and variations of the invention, as hereinabove set forth, can be made without departing from the spirit and scope thereof, and therefore only such limitations should be imposed as are indicated in the appended claims.

We claim:

1. A process for separating para xylene from a mixture containing para xylene and meta xylene by selective halogenation of said meta xylene which comprises heating said mixture with a metal catalyst selected from the group consisting of copper, manganese, cerium, cobalt, vanadium, chromium, iron, nickel, cadminum, tin, antimony, mercury, bismuth, the noble metals, and compounds of these metals; a substance selected from the group consisting of nitrate ions, nitrite ions, NO, $NO_2$ and $NO_2Cl$; a chloride ion or a bromide ion; oxygen; and an inert organic solvent containing less than about 28 percent by weight of water, resulting in an organic phase containing halogenated meta xylene and unreacted para xylene and an aqueous phase containing said solvent and said metal catalyst, separating said phases from each other and then subjecting said organic phase to distillation to recover unreacted para xylene therefrom.

2. The process of claim 1 wherein said solvent contains less than about 25 percent by weight of water.

3. The process of claim 1 wherein said metal is palladium.

4. The process of claim 1 wherein a compound of palladium is employed.

5. The process of claim 1 wherein the metal compound employed is palladium acetate.

6. The process of claim 1 wherein the metal compound employed is palladium nitrate.

7. The process of claim 1 wherein the metal compound is palladium chloride.

8. The process of claim 1 wherein the metal compound is palladium bromide.

9. The process of claim 1 wherein said substance is a nitrate ion.

10. The process of claim 1 wherein said substance is a nitrate ion obtained from nitric acid.

11. The process of claim 1 wherein a chloride ion is present during the reaction.

12. The process of claim 1 wherein a chloride ion obtained from hydrogen chloride is present during the reaction.

13. The process of claim 1 wherein the inert solvent is acetic acid.

14. The process of claim 1 wherein the metal compound is palladium acetate, the nitrate ions are obtained from nitric acid, the chloride ions are obtained from hydrogen chloride and the inert solvent is acetic acid.

15. The process of claim 1 wherein the metal compound is palladium acetate, the nitrate ions are obtained from nitric acid, the chloride ions are obtained from hydrogen chloride and the inert solvent is acetic acid containing less than about 25 percent by weight of water.

References Cited

UNITED STATES PATENTS

| 1,741,305 | 12/1929 | Jaeger | 260—674 |
| 2,889,382 | 6/1959 | Wohlers | 260—674 |
| 3,423,478 | 1/1969 | Zorn et al. | 260—674 |
| 3,509,204 | 4/1970 | Selwitz | 260—650 |

DELBERT E. GANTZ, Primary Examiner

C. E. SPRESSER, Jr., Assistant Examiner

U.S. Cl. X.R.

260—650 R